(12) United States Patent
Carmichael et al.

(10) Patent No.: US 10,289,733 B2
(45) Date of Patent: May 14, 2019

(54) SYSTEMS AND METHODS FOR FILTERING TECHNIQUES USING METADATA AND USAGE DATA ANALYSIS

(71) Applicant: Rovi Guides, Inc., Santa Clara, CA (US)

(72) Inventors: Craig Carmichael, Lakeville, MN (US); Sashikumar Venkataraman, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 882 days.

(21) Appl. No.: 14/578,911

(22) Filed: Dec. 22, 2014

(65) Prior Publication Data

US 2016/0179950 A1    Jun. 23, 2016

(51) Int. Cl.
*G06F 7/00*      (2006.01)
*G06F 17/30*   (2006.01)

(52) U.S. Cl.
CPC .. *G06F 17/30828* (2013.01); *G06F 17/30817* (2013.01)

(58) Field of Classification Search
CPC ......... G06F 17/30817; G06F 17/30828; G06F 17/30772; G06F 17/30743
See application file for complete search history.

(56) References Cited

U.S. PATENT DOCUMENTS

| | | | | |
|---|---|---|---|---|
| 6,005,597 A * | 12/1999 | Barrett | ............... | H04N 5/44543 348/564 |
| 8,639,706 B1 * | 1/2014 | Bilinski | ............ | G06F 17/30749 707/752 |
| 9,460,092 B2 * | 10/2016 | Murphy | ............ | G06F 17/30038 |
| 2007/0078836 A1 * | 4/2007 | Hangartner | ....... | G06F 17/30029 |
| 2007/0239553 A1 * | 10/2007 | Lin | .................... | G06F 17/30867 705/14.7 |
| 2008/0301149 A1 * | 12/2008 | Malcolm | .......... | G06F 17/30035 |
| 2009/0210415 A1 * | 8/2009 | Martin | .............. | G06F 17/30038 |
| 2009/0300008 A1 * | 12/2009 | Hangartner | ....... | G06F 17/30053 |
| 2009/0319513 A1 * | 12/2009 | Terao | ................ | G06F 17/30781 |
| 2010/0153885 A1 | 6/2010 | Yates | | |

(Continued)

OTHER PUBLICATIONS

Jojic et al., A probabilistic definition of item similarity, ResSys' 11, Oct. 23-27, 2011, Chicago, IL, pp. 229-236.

*Primary Examiner* — Hasanul Mobin
(74) *Attorney, Agent, or Firm* — Haley Guiliano LLP

(57) ABSTRACT

Systems and methods for maintaining a model representing similarity between media assets. Control circuitry receives a first vector of values for a first media asset and a second vector of values for a second media asset. The control circuitry determines whether a user has viewed both the first and second media assets. In response to determining that the user has viewed both assets, the control circuitry determines a modeled similarity value representing modeled similarity between the first and second media assets. The control circuitry retrieves an observed similarity value representing observed similarity between the first and second media assets based on metadata and usage data for the assets. The control circuitry determines a modeling error value based on the modeled similarity value and the observed similarity value. The control circuitry updates the first vector of values and the second vector of values based on the modeling error value.

18 Claims, 5 Drawing Sheets

(56) References Cited

U.S. PATENT DOCUMENTS

| | | | | |
|---|---|---|---|---|
| 2010/0199295 A1* | 8/2010 | Katpelly | ............ | G06F 17/30053 725/14 |
| 2010/0325125 A1* | 12/2010 | Bomfim | ............. | G06F 17/30053 707/759 |
| 2011/0276567 A1* | 11/2011 | Asikainen | ......... | G06F 17/30743 707/728 |
| 2012/0271823 A1* | 10/2012 | Asikainen | ......... | G06F 17/30743 707/736 |
| 2013/0041903 A1* | 2/2013 | Lindley | ............. | G06F 17/30038 707/740 |
| 2013/0046766 A1* | 2/2013 | Shishido | ........... | G06F 17/30752 707/741 |
| 2013/0111526 A1* | 5/2013 | Glowaty | ........... | G06F 17/30817 725/53 |
| 2013/0332962 A1* | 12/2013 | Moritz | ............... | H04N 21/2407 725/46 |
| 2014/0088952 A1* | 3/2014 | Fife | ......................... | G06F 17/27 704/9 |
| 2014/0282281 A1* | 9/2014 | Ram | .................. | G06Q 30/0251 715/863 |

\* cited by examiner

500

```
502 ── <asset vector>
  504 ──   <number> i </number>
  506 ──   <title>
  508 ──     <string> pacific rim <string>
  510 ──     <vector> vector 1 </vector>
  512 ──     <weight> weight 1 </weight>
           </title>
  514 ──   <actor>
  516 ──     <string> idris elba <string>
  518 ──     <vector> vector 2 </vector>
  520 ──     <weight> weight 2 </weight>
           </actor>
  522 ──   <director>
  524 ──     <string> guillermo del toro <string>
  526 ──     <vector> vector 3 </vector>
  528 ──     <weight> weight 3 </weight>
           </director>
  530 ──   <producer>
  532 ──     <string> thomas tull <string>
  534 ──     <vector> vector 4 </vector>
  536 ──     <weight> weight 4 </weight>
           </producer>
  538 ──   <genre>
  540 ──     <string> science fiction <string>
  542 ──     <vector> vector 5 </vector>
  544 ──     <weight> weight 5 </weight>
           </genre>
  546 ──   . . .
  548 ──   <free floating>
  550 ──     <vector> vector N </vector>
             <weight> weight N </weight>
           </free floating>
           . . .
  552 ── </asset vector>
```

```
602 ─ <asset vector>
  604 ─ <number> j </number>
  606 ─ <title>
    608 ─ <string> godzilla <string>
    610 ─ <vector> vector 1 </vector>
    612 ─ <weight> weight 1 </weight>
         </title>
  614 ─ <actor>
    616 ─ <string> ken watanabe <string>
    618 ─ <vector> vector 2 </vector>
    620 ─ <weight> weight 2 </weight>
         </actor>
  622 ─ <director>
    624 ─ <string> gareth edwards <string>
    626 ─ <vector> vector 3 </vector>
    628 ─ <weight> weight 3 </weight>
         </director>
  630 ─ <producer>
    632 ─ <string> thomas tull <string>
    634 ─ <vector> vector 4 </vector>
    636 ─ <weight> weight 4 </weight>
         </producer>
  638 ─ <genre>
    640 ─ <string> science fiction <string>
    642 ─ <vector> vector 5 </vector>
    644 ─ <weight> weight 5 </weight>
         </genre>
         . . .
  646 ─ <free floating>
    648 ─ <vector> vector N </vector>
    650 ─ <weight> weight N </weight>
         </free floating>
         . . .
652 ─ </asset vector>
```

FIG. 6

SYSTEMS AND METHODS FOR FILTERING TECHNIQUES USING METADATA AND USAGE DATA ANALYSIS

BACKGROUND

Traditional systems may compute similarity between two media assets based on metadata attributes. For example, the system may use a model by which individual media assets are considered similar based on shared metadata attributes. Although the similarity metrics produced by these systems may be effective, the models do not take into account other factors that can improve the similarity metrics.

SUMMARY

Accordingly, systems and methods for training a model to generate asset vectors related to media assets are described. As referred to herein, the term "asset vector" refers to a collection of values associated with attributes of a media asset which may be stored as an array of the values where each value in the array corresponds to a different dimension of the vector. As referred to herein, the term "attribute" includes any content that describes or is associated with a media asset. The attribute may include a genre, category, content source, title, series information or identifier, characteristic, actor, director, cast information, crew, plot, location, description, descriptor, keyword, artist, mood, tone, lyrics, comments, rating, length or duration, transmission time, availability time, sponsor, and/or any combination thereof. In some embodiments, the model takes as input a corpus of media assets, the metadata information of each media asset, and usage data of one or more users. The metadata may include information such as genre, keyword, description, and other suitable information such as any of the attributes listed above.

In media assets, one often encounters rich metadata associated with media assets such as genre, keywords, description, etc. However, the relevance or weight of each individual piece of metadata (for finding similar movies or recommendations) is often lacking, missing or wrong due to multiple sources, algorithms, or manual-entry involved. For example, a show is a comedy but exactly how funny is it and how it impacts in getting other funny shows is a more viewing sentiment. Usage data on the other hand provides a different kind of information in conveying what programs co-occur in watching behavior across users and what the mutual attitude is towards those programs.

The metadata-based information for each media asset may be represented in the form of an asset vector that includes a set of attributes and the associated weights or relevance of the metadata information for the media asset. In some embodiments, the system first generates the model by generating asset vectors related to the media assets and then modifying the weights of the asset vectors based on usage data associated with the media assets. The asset vectors may be updated based on the usage data to update the weights in the asset vector to be more accurate by being consistent with the usage data.

For example, to some users, movies with titles "pacific rim" and "godzilla" may seem very similar because of their genre "science fiction." To some users, the movies may not seem so similar because of, e.g., their titles or their directors, or because of other unexplained reasons that may not be suitably captured using metadata information. The unexplained factors may be included as free floating components in the media asset vectors for the movies and may be updated to capture information other than that available via metadata-based information by, e.g., accounting for usage data relating to the movies. For example, users may or may not rate both movies similarly or may or may not watch them at similar times after their release.

The media guidance application may model a metadata similarity between the two asset vectors based on the individual metadata information and the corresponding weights. Furthermore, the known individual vectors may be determined independently by other known algorithms based on co-occurrences of terms in large corpus (such as WORD2VEC). In some embodiments, the media guidance application may employ a word vector representation tool such as WORD2VEC which take a text corpus as input and produces word vectors as output. More information regarding the WORD2VEC tool may be found at code.google.com/p/word2vec.

The resulting word vectors for the metadata of a media asset may be used to form the asset vector for the media asset. The asset vector includes metadata information of each media asset as a weighted combination of individual metadata, such as genre, category, keywords, or any suitable attribute-level detail. For example, for the movie "pacific rim," the system can take the word "pacific," lookup that word in the given word2vec binary file and obtain the associated dimensional vector for that word, and then similarly obtain the vector for "rim" and add the two vectors together to get a component of the asset vector related to this metadata. It may be possible that "pacific rim" as a title is not very indicative of a movie about giant monsters invading the earth but yields some information from where the monsters came from in the movie. In such a case, the weight on the metadata component may shrink to far less than 1. On the other hand, a detailed description for "pacific rim" may contain words similar to "giant," "monsters," and "invasion" which will be a better representation of the movie through the description attribute. Thus, the associated weight may be much higher than that for the title in this case. In some embodiments, the asset vectors may include free floating components to capture the hidden or unexplained reasons for similarity of media assets. The free floating vectors may be initially set to zero, a random value, or any other suitable vector value. After training to minimize the error function, the free floating terms contain an optimal set of numerical elements. The free floating components and their weights may capture latent factors that are not exposed via, e.g., the WORD2VEC analysis. For example, the latent factors may relate to metadata or usage information that was not captured through the WORD2VEC analysis or any known metadata attribute in general.

In some embodiments, the media guidance application computes a usage similarity based on usage information along with implicit/explicit ratings of users who watched the media assets. The weights or relevance of the individual pieces of metadata are then determined by fitting the metadata similarities closest to the usage similarities. For example, media asset vectors may have associated usage data relating to user rating, amount of time viewed, timing of viewing the movie, sentiment expressed via social media, or other suitable information. For example, asset vector 500 for movie "pacific rim" may have a user rating of 6.9/10, amount of time viewed of 80%, timing of viewing the movie as five days after the movie release, and sentiment capture of three tweets via social media. Asset vector 600 for movie "Godzilla" may have a user rating of 7.5/10, amount of time viewed of 95%, timing of viewing the movie as three days after the movie release, and sentiment capture of five tweets via social media.

The usage information may be separately modeled to produce item-item similarity wherein items watched together and similarly evaluated/rated (which may be referred to as common sentiment) across multiple users have better usage-similarity. As described above, above the user's sentiment further involve attributes such as explicit rating (if available), time viewed, associating timing of watching, number of episodes watched, and sentiment capture (e.g., blogged, tweeted, reviewed, or via any other suitable process).

In some embodiments, the media guidance application attempts to mutually align pairs of the media asset vectors as close as possible to the usage based similarities over the same pairs. The media guidance application constructs an error function that compares the modeled metadata similarity to the observed usage-based similarity (e.g., based on co-occurrence combined with sentiment factors). This error is minimized using a function (e.g., a stochastic gradient descent function or another suitable gradient descent function) that changes the weights of the individual metadata components such that the net error between the metadata-based similarities and usage-based similarities is minimized. After iterating over all the usage data, the individual metadata weights are updated in the media asset vector as the best predictors for the corresponding metadata relevance for the media asset.

In some embodiments, the media guidance application compares observed usage-based similarity and modeled metadata similarity to determine model error. If the error is below a threshold value, then no further adaption is required as the model is sufficiently trained. If the error is more than the threshold value, the system adapts the model for the media assets by, e.g., backpropagating error through the model. The system may update weights in the media asset vectors and update other relevant terms needed for the similarity computation.

In some embodiments, the error function includes a confidence term/weight for each pair of compared similarities. This represents the likelihood, generally normalized to between 0 and 1, that the comparison between observation and modeled similarities for a given item-item pair is potentially accurate. For example, if more than one usage data set exists, where a first data set includes sonly (watched, not watched) usage information with a small number of users and a second data set includes many users with explicit or numerous details representing their sentiment, then the second data set will have a higher confidence than the first. While the metadata-based similarities may remain the same in this case, the observed computations will differ and have a different confidence associated with the pair (such that bigger changes in the error are attributed to the more accurate observed values).

In some embodiments, metadata at the attribute level may be initialized to a word vector representation and presented in the error function as described above. Yet in this case even the attribute-level vectors may be modified during training using a similar approach to relevance terms (e.g., chain rule, gradient descent, etc.). A genre such as "western," for example, may be initialized to the general meaning of the word "western" but this is partially vague and may imply direction akin to northern, eastern, or southern. A tuning stage may allow the term to float to more specifically what this genre means for multimedia.

In some aspects, the control circuitry receives a first vector of values associated with a first media asset and a second vector of values associated with a second media asset. The control circuitry determines whether a user has viewed both the first media asset and the second media as set. In response to determining that the user has viewed both the first media asset and the second media asset, the control circuitry determines a modeled similarity value representing modeled similarity between the first media asset and the second media asset. The modeled similarity value is determined based on the first vector of values and the second vector of values. The control circuitry further retrieves an observed similarity value representing observed similarity between the first media asset and the second media asset. The observed similarity is based on usage data for the first and second media assets, and the modeled similarity is based on metadata with relevance weighting for the first and second media assets. The control circuitry further determines a modeling error value based on the modeled similarity value and the observed similarity value, with an associated confidence in the comparison, if provided. The control circuitry further updates the first vector of values associated with the first media asset and the second vector of values associated with the second media asset based on the modeling error value.

In some embodiments, the first vector of values associated with the first media asset includes one or more metadata-based values related to metadata for the first media asset and one or more free floating values unrelated to metadata for the first media asset.

In some embodiments, the control circuitry updates the first vector of values associated with the first media asset by updating the one or more free floating values and not updating the one or more metadata-based values.

In some embodiments, the control circuitry updates the first vector of values associated with the first media asset by updating the one or more free floating values and updating the one or more metadata-based values.

In some embodiments, the control circuitry updates the first vector of values associated with the first media asset by updating the one or more free floating values and/or updating the one or more metadata-based values.

In some embodiments, the control circuitry determines the modeling error value by determining the modeling error value based on a confidence term. A higher confidence term indicates a higher trust in the usage data. Higher confidence may be seen if a usage data set has a greater time span (e.g., capturing most or all users), better sentiment approximation (e.g., explicit user ratings), more number of users, or any other suitable criteria indicating trust. In some embodiments, multiple usage data sets being leveraged simultaneously in the described systems and methods may have different values for their respective confidence terms.

In some embodiments, metadata for the first media asset includes at least one of genre, category, content source, title, series identifier, characteristic, actor, director, cast information, crew, plot, location, description, descriptor, keyword, artist, mood, tone, lyrics, comments, rating, length or duration, transmission time, availability time, and sponsor.

In some embodiments, usage data for the first media asset includes at least one of a rating from the user, an amount of time viewed (or listened to, e.g., for music) by the user, a time at which viewed by the user, number of episodes watched by the user, and number of related social media interactions by the user, tune in count, price of asset, number of times exposed to user (to select to view), speed of viewing multiple episodes, speed of viewing first time versus first time available, order viewed, and comment/blog projected onto the word vector for "enjoy" or "like," etc.

In some embodiments, the control circuitry retrieves a threshold error value associated with the model. The control circuitry determines whether the modeling error value is below the threshold error value. The control circuitry further updates the first vector of values associated with the first media asset and the second vector of values associated with the second media asset based on the modeling error value in response to determining that the modeling error value is not below the threshold error value.

In some embodiments, the control circuitry determines the modeled similarity value by determining a distance between the first vector of values and the second vector of values based on a dot product between the first vector of values and the second vector of values and determining the modeled similarity value based on the determined distance.

In some embodiments, the control circuitry updates the first vector of values and second vector of values based on the modeling error value by adjusting the values stored in the first vector and the second vector such that the distance between the first vector and the second vector is reduced.

In some embodiments, the observed similarity is determined using Pearson correlation coefficient between the first media asset and the second media asset. In addition the computation may allow for a weighted Pearson correlation coefficient where the observed sample point is the estimated implied rating and the confidence/weight in the calculation is the probability that the implied rating is accurately representing the user sentiment.

In some embodiments, the control circuitry stores a zero value for the modeling error value in response to determining that no user has viewed both the first media asset and the second media asset.

In some aspects, the systems and methods described herein include a method, an apparatus, or non-transitory machine-readable media for searching for a media asset configured to execute the functionality described above.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 5-6 show illustrative asset vectors in accordance with some embodiments of the disclosure.

DETAILED DESCRIPTION

Figure 1:
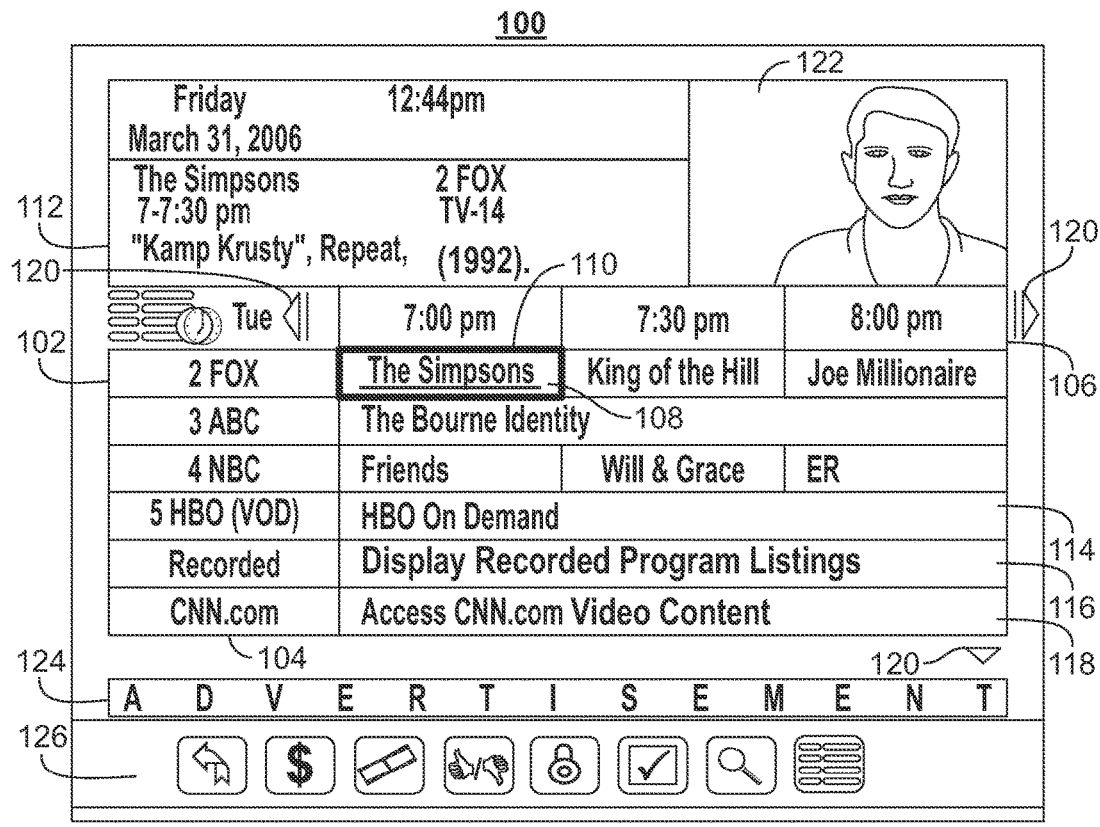
FIGS. 1 and 2 show illustrative display screens that may be used to provide media guidance application listings in accordance with an embodiment of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, media asset vectors, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
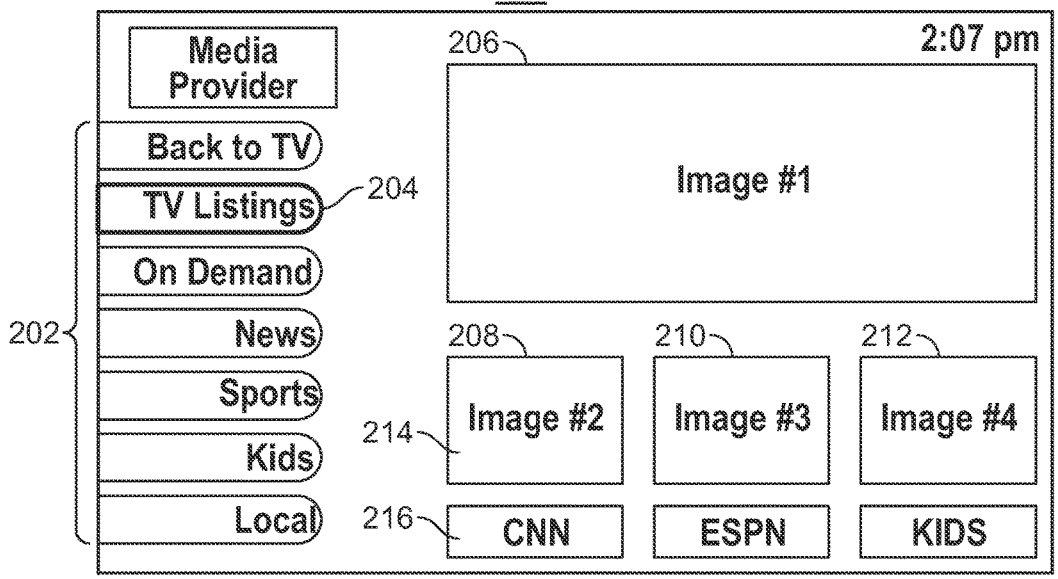

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases. The content identified in advertisement 124 may be selected based on media asset vectors (discussed below).

For example, the media guidance application may identify a current user of user equipment device 300. The media guidance application may select a media asset recently consumed by the current user. The media guidance application may identify a second media asset (e.g., a media asset the current user has not previously consumed) that is related to the selected media asset (e.g., a media asset associated with a vector having a shortest distance among other media asset vectors to the selected media asset). In some embodiments, the shortest distance may be determined by the media guidance application by first computing a dot product between a multi-dimensional vector of the selected media asset and a multi-dimensional vector of each other media asset. In some implementations, a distance between two vectors may be determined using a gradient descent function on a softmax classifier function. Then, the media guidance application may identify the second media asset related to the selected media asset based on which dot product is closest to a predetermined value (e.g., '1'). In some implementations, the media guidance application may only identify another media asset that the current user has not previously consumed or a media asset that the current user has not previously consumed in a particular amount of time (e.g., more than 2 weeks). The second media asset may then be presented to the current user in the form of advertisement 124.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. In some embodiments, advertisement content, including those of products and services, may be converted to word vector representations (e.g., directly from descriptive text or from images/video to concept/features to text to vectors) and combined to form an ad-based asset vector. The media guidance application in this case may produce a weighted average of a user's latest N consumed media asset vectors factoring recency and implicit/explicit ratings and evaluate each potential ad by estimating the similarity between the N-weighted asset vector and the potential ad's asset vector. A ranked set of the most beneficial ads may be produced by ordering based on this similarity value. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
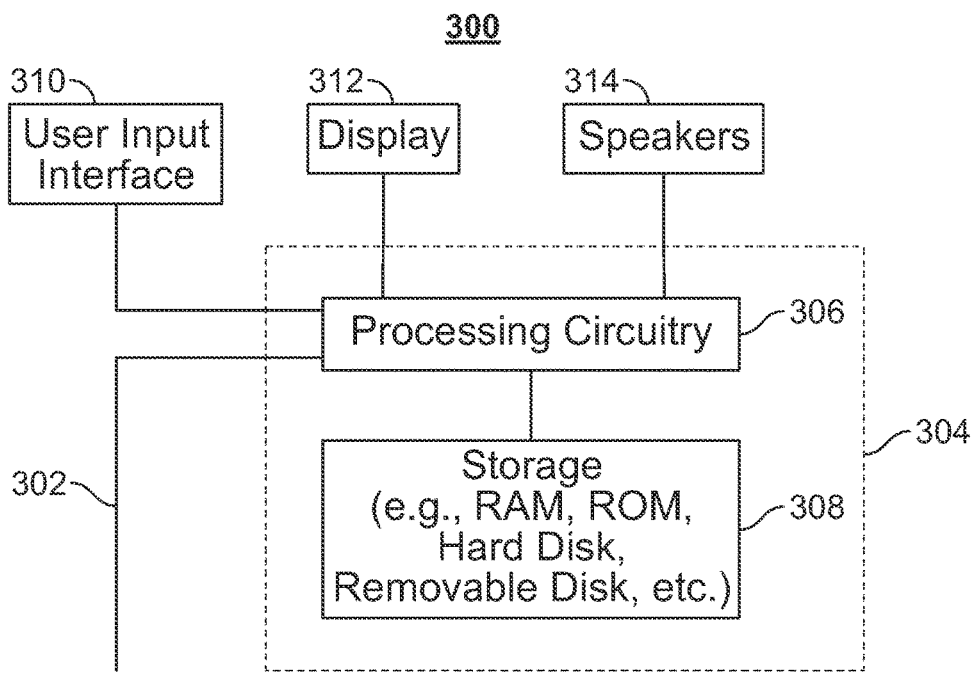
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same.

Storage 308 may be used to store various types of content described herein as well as media guidance data described above. For example, storage 308 may be used to store multi-dimensional vectors associated with each media asset. Storage 308 may be used to store media consumption activity and/or a viewing history (e.g., identifying which media assets have been viewed or consumed by a given user) associated with various users to generate/update the media asset vectors. Nonvolatile memory may also be used (e.g., to launch a boot-up routine and other instructions). Storage 308 may be used to store the function that is used to generate/update the media asset vectors. Cloud-based storage, described in relation to FIG. 4, may be used to supplement storage 308 or instead of storage 308. In some embodiments, the viewing history stored for each user may include activity the user performed related to the first and second media assets. The activity may include percentage of the media asset the user watched (consumed), how many comments on a social network the user made about the media asset, how many other media asset episodes in a series associated with the media asset the user consumed, how often the user access a content source from which the media asset was received by the user for consumption, a rating the user assigned to the media asset, an explicit rating of the media asset, the time the user consumed the media asset, and/or any combination thereof.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
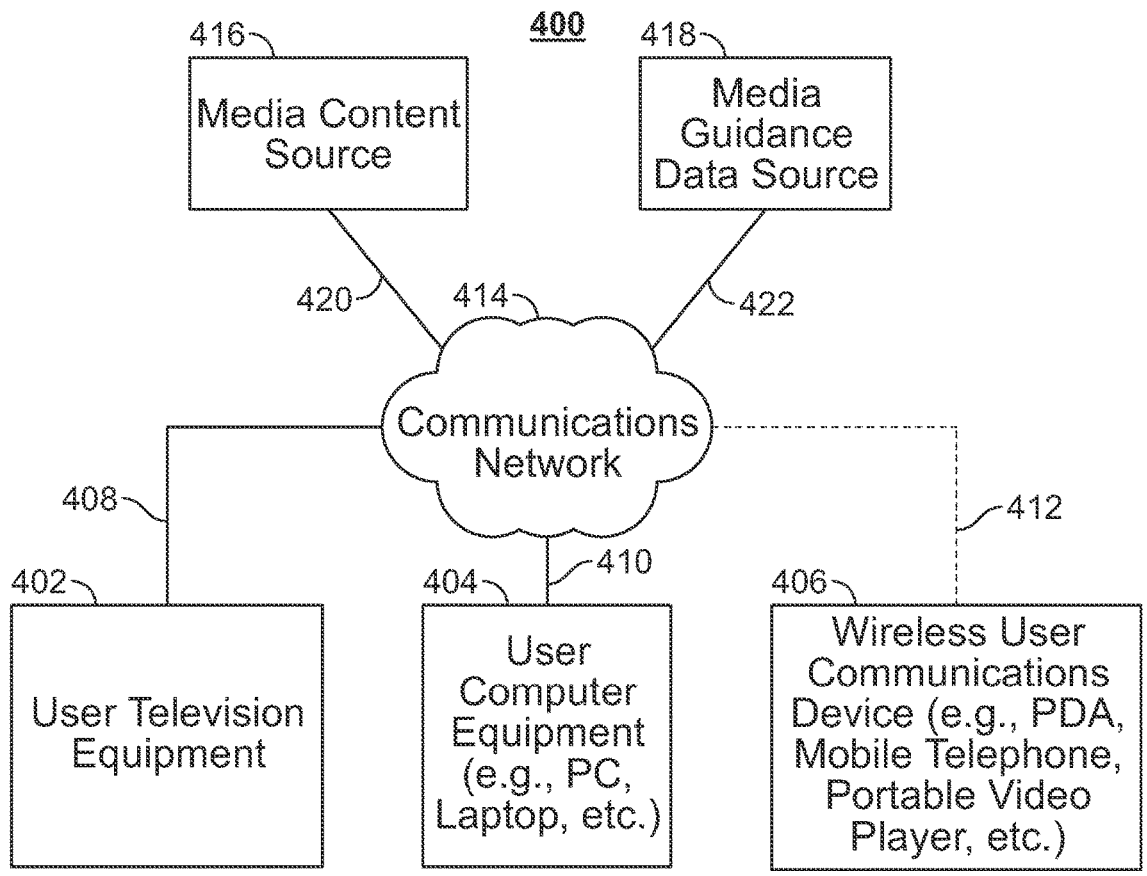
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, which provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, the media guidance application trains a model to generate asset vectors related to media assets. As referred to herein, the term "asset vector" refers to a collection of values associated with attributes of a media asset which may be stored as an array of the values where each value in the array corresponds to a different dimension of the vector. As referred to herein, the term "attribute" includes any content that describes or is associated with a media asset. The attribute may include a genre, category, content source, title, series information or identifier, characteristic, actor, director, cast information, crew, plot, location, description, descriptor, keyword, artist, mood, tone, lyrics, comments, rating, length or duration, transmission time, availability time, sponsor, and/or any combination thereof. In some embodiments, the model takes as input a corpus of media assets, the metadata information of each media asset, and usage data of one or more users. The metadata may include information such as genre, keyword, description, and other suitable information such as any of the attributes listed above.

The asset vector for a media asset includes a set of associated weights or relevance of the metadata information for the media asset. In some embodiments, the system first generates the model by generating asset vectors related to the media assets and then modifying the weights of the asset vectors based on usage data associated with the media assets. The asset vectors may be updated based on the usage data to update the weights in the asset vector to be more accurate by being consistent with the usage data.

FIGS. 5-6 show illustrative asset vectors in accordance with some embodiments of the disclosure. Asset vectors 500 and/or 600 may be retrieved from storage 308 or retrieved in any other suitable manner. In some embodiments, asset vectors 500 and 600 are received by control circuitry 304 as described with reference to step 704 in FIG. 7. Asset vectors 500 and 600 may include a plurality of fields.

In the illustrated embodiment, asset vector 500 includes fields 502-552. Field 502 indicates the beginning of the asset vector and field 552 indicates the end of the asset vector. Field 504 indicates the number for the related media asset, i. Fields 506-512 indicate the title metadata "pacific rim" (field 508) and associated vector (field 510) and weight (field 512) for the title metadata. Fields 514-520 indicate the actor metadata "idris elba" (field 516) and associated vector (field 518) and weight (field 520) for the actor metadata. Fields 522-528 indicate the director metadata "guillermo del toro" (field 524) and associated vector (field 526) and weight (field 528) for the director metadata. Fields 530-536 indicate the producer metadata "thomas tull" (field 532) and associated vector (field 534) and weight (field 536) for the producer metadata. Fields 538-540 indicate the genre metadata "science fiction" (field 540) and associated vector (field 542) and weight (field 544) for the genre metadata. Fields 546-550 indicate a free floating component of the asset vector and associated vector (field 548) and weight (field 550) for the title metadata. The asset vector may include one or more such free floating components.

In the illustrated embodiment, asset vector 600 includes fields 602-652. Field 602 indicates the beginning of the asset vector and field 652 indicates the end of the asset vector. Field 604 indicates the number for the related media asset, j. Fields 606-612 indicate the title metadata "godzilla" (field 608) and associated vector (field 610) and weight (field 612) for the title metadata. Fields 614-620 indicate the actor metadata "ken watanabe" (field 616) and associated vector (field 618) and weight (field 620) for the actor metadata. Fields 622-628 indicate the director metadata "gareth edwards" (field 624) and associated vector (field 626) and weight (field 628) for the director metadata. Fields 630-636 indicate the producer metadata "thomas tull" (field 632) and associated vector (field 634) and weight (field 636) for the producer metadata. Fields 638-640 indicate the genre metadata "science fiction" (field 640) and associated vector (field 642) and weight (field 644) for the genre metadata. Fields 646-650 indicate a free floating component of the asset vector and associated vector (field 648) and weight (field 650) for the title metadata. The asset vector may include one or more such free floating components.

Asset vectors 500 and 600 are associated with movies with titles "pacific rim" and "godzilla," respectively. To some users, these movies may seem very similar because of the genre "science fiction." To some users, the movies may not seem so similar because of, e.g., their titles or their directors, or because of other unexplained reasons that may not be suitably captured using metadata information.

The media guidance application may model a metadata similarity between the two asset vectors based on the individual metadata information and the corresponding weights. Furthermore, the known individual vectors may be determined independently by other known algorithms based on co-occurrences of terms in large corpus (such as WORD2VEC). In some embodiments, the media guidance application may employ a tool such as WORD2VEC which take a text corpus as input and produces word vectors as output. More information regarding the WORD2VEC tool may be found at code.google.com/p/word2vec.

The resulting word vectors for the metadata of a media asset may be used to form the asset vector for the media asset. The asset vector includes metadata information of each media asset as a weighted combination of individual metadata, such as genre, category, keywords, or any suitable attribute-level detail. For example, for the movie "pacific rim," the system can take the word "pacific," lookup that word in the given word2vec binary file and obtain the associated dimensional vector for that word, and then similarly obtain the vector for "rim" and add the two vectors together to get a component of the asset vector related to this metadata. It may be possible that "pacific rim" as a title is not very indicative of a movie about monsters invading the earth but yields some information from where the monsters came from in the movie. In such a case, the weight on the metadata component may shrink to far less than 1. In some embodiments, the asset vectors may include free floating components to capture the hidden or unexplained reasons for similarity of media assets. The free floating vectors may be initially set to zero, a random value, or any other suitable vector value. After training to minimize the error function, the free floating terms contain an optimal set of numerical elements.

Asset vectors may be represented as a combination of metadata-based x terms and free floating unexplained y terms:

$$a_{if} = x_{if} + y_{if}$$

where across all factors f∈F, there exists asset vector $\bar{a}_i$ which defines the modeled content within media asset i. For aspects of each media asset that are explainable and unexplainable through metadata, $x_{if}$ may represent media asset terms explained from available metadata and $y_{if}$ may represent media asset terms not explained from available metadata, i.e., the free floating components.

The free floating components and their weights may capture latent factors that are not exposed via, e.g., the WORD2VEC analysis. For example, the latent factors may relate to metadata or usage information that was not captured through the WORD2VEC analysis. In some embodiments, the media guidance application processes the asset vector for each media asset such that the latent factors are limited to a small component (the y term) and the known metadata-based information forms the bulk of the asset vector (the x term).

In some embodiments, each piece of metadata is represented as a vector in a K-dimensional vector space (e.g., K may typically vary from 100-300 or any suitable value). Each asset vector is a weighted sum of individual vectors and hence also a vector in this space. The relationship between media asset vectors (e.g., dot product between media asset vectors) produces a model for metadata similarity. In certain embodiments, the missing pieces of metadata are further modeled as a vector in the same vector space with unknown parameters. The goal of the problem is then trying to predict the relevance weights of the known pieces of individual metadata as well as the vector that represents the missing metadata for each media asset. A metadata similarity of the two assets is modeled as a function of these individual metadata.

In some embodiments, the media guidance application computes a usage similarity based on usage information along with implicit/explicit ratings of users who watched the media assets. The weights or relevance of the individual pieces of metadata are then determined by fitting the metadata similarities closest to the usage similarities. For example, asset vectors 500 and 600 may be associated with related usage information. Asset vectors 500 and 600 may have associated usage data relating to user rating, amount of time viewed, timing of viewing the movie, sentiment expressed via social media, or other suitable information. For example, asset vector 500 for movie "pacific rim" may have a user rating of 6.9/10, amount of time viewed of 80%, timing of viewing the movie as five days after the movie release, and sentiment capture of three tweets via social media. Asset vector 600 for movie "Godzilla" may have a user rating of 7.5/10, amount of time viewed of 95%, timing of viewing the movie as three days after the movie release, and sentiment capture of five tweets via social media.

The usage information may be separately modeled to produce item-item similarity wherein items watched together and similarly evaluated/rated (which may be referred to as common sentiment) across multiple users have better usage-similarity. As described above, above the user's sentiment further involve attributes such as explicit rating (if available), time viewed, associating timing of watching, number of episodes watched, and sentiment capture (e.g., blogged, tweeted, reviewed, or via any other suitable process).

In some embodiments, the media guidance application attempts to align the media asset vectors as close as possible to the usage based similarities. The media guidance application constructs an error function that compares the modeled metadata similarity to the observed usage-based similarity (e.g., based on co-occurrence combined with sentiment factors). This error is minimized using a function (e.g., a stochastic gradient descent function or another suitable gradient descent function) that changes the weights of the individual metadata components such that the net error between the metadata-based similarities and usage-based similarities is minimized. After iterating over all the usage data, the individual metadata weights are updated in the media asset vector as the best predictors for the corresponding metadata relevance for the media asset.

For example, the system may compute observed similarity, $s_{ij}$, for media assets i and j and confidence metric $c_{ij}$ (based on metadata and usage data) using collaborative filtering. For explicitly rated shows, the Pearson correlation coefficient may be used, where $s_{ij}=P_{ij}$:

$$P_{ij} = \frac{\sum_{u \in (i,j)}^{U} (R_{ui} - \overline{R}_i)(R_{uj} - \overline{R}_j)}{\sqrt{\sum_{u \in (i,j)}^{U} (R_{ui} - \overline{R}_i)^2} \sqrt{\sum_{u \in (i,j)}^{U} (R_{uj} - \overline{R}_j)^2}}$$

For each user u of U total users having watched and rated both media assets i and j. In the example above, $R_{ui}=0.69$ and $R_{uj}=0.75$ correspond to the user ratings. The media guidance application may receive the ratings of the rest of the users that watched both media assets, the compute averages $\overline{R}_i$ and $\overline{R}_j$ based on the received data. With this information, the system may compute observed similarity, $s_{ij}=P_{ij}$. In some embodiments, the media guidance application normalizes between zero and 1 based on the equation, $s_{ij}=0.5*(P_{ij}-1)$.

In some embodiments, the media guidance application computes the observed similarity using Probsim, LogLikelihood, Jaccard, Cooccurrences, Cosine, or any other suitable process. Jojic et al. provide an illustrative embodiment of a process for obtaining sentimental similarities between two media assets in "A Probabilistic Definition of Item Similarity," RecSys'11, Oct. 23-27, 2011, Chicago, Ill., USA. In some embodiments, if media assets i and j have both not been viewed by any user, then confidence metric $c_{ij}$ is zero and the contribution in the error term is zero. Therefore no adjustments need to be propagated backwards from the pair of media assets i and j.

The media guidance application may compute modeled similarity, $m_{ij}$, for assets i and j by, e.g., taking dot product of $a_j$ and $a_j$ where $p_i$ and $p_j$ are popularity of assets i and j, $p_0$ is popularity of most popular asset, and $\alpha$ is popularity bias factor. These terms are used to factor in popularity bias into the modeled similarity. With modeled similarity $m_{ij}$ defined by the dot product of asset vectors $\overline{a}_i$ and $a_1$, which is further broken down below, as well as a popularity bias term:

$$m_{ij} = \left(\frac{p_i p_j}{p_0^2}\right)^\alpha \sum_f a_{if} a_{jf}$$

where:
$p_i$ Popularity of i such as probability of watching over observed timeframe
$p_o$ Most popular show's popularity
$\alpha$ Term to factor in popularity bias into the model
$a_{if}$ Media asset factors representing a show's "latent factors"
f Latent factor index, e.g., F=300

The media guidance application compares observed similarity $s_{ij}$ and modeled similarity $m_{ij}$ to determine model error. If the error is below a threshold value, then no further adaption is required as the model is sufficiently trained. If the error is more than the threshold value, the system adapts model for assets i and j by, e.g., backpropagating error through both models. The system may update weights in media asset vectors $a_i$ and $a_j$ and update other relevant terms in the computation above such as popularity bias factor $\alpha$. In some embodiments, the adaptation computation may be represented as minimizing the error E between observed and modeled similarities across all media asset pairs:

$$E = \sum_{ij} c_{ij}(s_{ij} - m_{ij})^2$$

where:
ij Media asset pair ij
$s_{ij}$ Observed "sentimental" similarity between ij (Pearson, Probsim etc)
$m_{ij}$ Modeled similarity
$c_{ij}$ Confidence in observed similarity $s_{ij}$ In some embodiments, the metadata-based x terms of a media asset vector may be further broken down, e.g., as the combination of metadata from a wiki page (from WIKIPEDIA.COM) and a movie data page (from IMDB.COM) associated with media asset i as well as keyword and genre based metadata, and represented as:

$$x_{ij} = v_i^{wiki} w_{ij}^{wiki} + v_i^{imdb} w_{ij}^{imdb} + v_i^{desc} w_{ij}^{desc} + v_i^{plot} w_{ij}^{plot} + v_i^{genres} w_{ij}^{genres} + v_i^{key} w_{ij}^{key} + v_a^{actors} w_{ij}^{actors} + v_d^{dir} w_{ij}^{dir} + v_p^{prod} w_{ij}^{prod}$$

or in a normalized form as:

$$x_{if} = \frac{v_i^{wiki} w_{if}^{wiki} + v_i^{imdb} w_{if}^{imdb} + v_i^{desc} w_{if}^{desc} + v_i^{plot} w_{if}^{plot} + v_i^{genres} w_{if}^{genres} + v_i^{key} w_{if}^{key} + v_a^{actors} w_{if}^{actors} + v_d^{dir} w_{if}^{dir} + v_p^{prod} w_{if}^{prod}}{v_i^{wiki} + v_i^{imdb} + v_i^{desc} + v_i^{plot} + v_i^{genres} + v_i^{key} + v_i^{actors} + v_i^{dir} + v_i^{prod}}$$

In some embodiments, title-based metadata, other web pages containing descriptive text-based information related to media asset i, and other suitable descriptions may be included in the combination. For example, relevance weights v and vectorized weights w may be initialized using WORD2VEC described above for the following types of descriptions:

$v_i^{wiki} = v_0^{wiki} \tilde{v}_i^{wiki}$ (WIKIPEDIA representation for media asset i)
$v_i^{imdb} z = v_0^{imdb} \tilde{v}_i^{imdb}$ (IMDB representation for media asset i)
$v_i^{desc} = v_0^{desc} \tilde{v}_i^{desc}$ (descriptors for media asset i)
$v_i^{plot} = v_0^{plot} \tilde{v}_i^{plot}$ (plot for media asset i)
$v_i^{genres} = v_0^{genres} \tilde{v}_i^{genres}$ (genres for media asset i)
$v_i^{key} = v_0^{key} \tilde{v}_i^{key}$ (keywords for media asset i)
$v_i^{actors} = v_0^{actors} \tilde{v}_i^{actors}$ (actors in media asset i)
$v_i^{prod} = v_0^{prod} \tilde{v}_i^{prod}$ (producer in media asset i)
$v_i^{dir} = v_0^{dir} \tilde{v}_i^{dir}$ (director in media asset i)

where:
$v_0$ Represents overall metadata effects
$\tilde{v}_i$ Represents effects specific to media asset i Since each media asset i typically contains multiple genres, keywords, and actors, they may be combined using the following equations. For example, multiple genres for media asset i may be combined and represented as:

$$w_{if}^{genres} = \frac{\sum_{g \in i}^{genres\ in\ i} v_g^{genre} w_{gf}^{genre}}{\sum_{g \in i}^{genres\ in\ i} v_g^{genre}}$$

Similarly, multiple keywords for media asset i may be combined and represented as:

$$w_{if}^{keywords} = \frac{\sum_{k \in i}^{keywords\ in\ i} v_k^{keyword} w_{kf}^{keyword}}{\sum_{k \in i}^{keywords\ in\ i} v_k^{keyword}}$$

For example, multiple actors for media asset i may be combined and represented as:

$$w_{if}^{actors} = \frac{\sum_{a \in i}^{actors\ in\ i} v_a^{actor} w_{af}^{actor}}{\sum_{a \in i}^{actors\ in\ i} v_a^{actor}}$$

Where $w_{*_f}$ may be initially set to the WORD2VEC vector and updated according to the systems and methods described herein.

In some embodiments, for webpage-based vectors such as WIKIPEDIA and IMDB the media guidance application iterates through all the words on the webpage associated with media asset i and the combination is represented as:

$$w_{if}^{wiki} = \frac{\sum_{l \in i}^{words\ in\ i} v_l^{wiki} w_{lf}^{wiki}}{\sum_{l \in i}^{words\ in\ i} v_l^{wiki}}$$

Similarly, the webpage-based descriptions for for each actor a in media asset i may be be obtained through WIKIPEDIA, IMDB, or similar websites and the combination is represented as:

$$w_{af}^{actor} = \frac{\sum_{l \in (a \in i)}^{words\ in\ wiki\ (actor\ a \in i)} v_l^{wiki} w_{lf}^{wiki}}{\sum_{l \in (a \in i)}^{words\ in\ wiki\ (actor\ a \in i)} v_l^{wiki}}$$

In some embodiments, the media assets that the actors have been a part of may be weighted by popularity and represented as:

$$w_{af}^{actor} = \frac{\sum_{j}^{shows\ acted\ in\ by\ a} p_j w_{if}^{wiki}}{\sum_{j}^{shows\ acted\ in\ by\ a} p_j}$$

In some embodiments, the media guidance application analyzes a WIKIPEDIA, IMDB, or another suitably sourced webpage and represents the vector $v_i^{wiki}$ for the $l^{th}$ word in the webpage associated with media asset i as follows:

$$v_l^{wiki} = \left(\frac{n_i^{wiki} - l}{n_i^{wiki}}\right)^\gamma \left(\frac{\beta}{freq(\text{word}(l)) + \beta}\right)$$

where:

$n_i^{wiki}$ Number of words in the webpage for i freq(word (l)) Number of occurrences of word l across all webpages $\beta$ Term to prevent rare words from becoming overly important $$\frac{n_i^{wiki} - l}{n_i^{wiki}}$$

Term to create more importance for word l if earlier in the webpage $\gamma$ Term to control importance of whether word word l is early or not in the webpage In some embodiments, a number of suitable combinations of the metadata-based information may be considered based on the systems and methods described herein and may be used to derive the components of the media asset vectors with as many variations as would be apparent to one of ordinary skill in the art.

Figure 7:
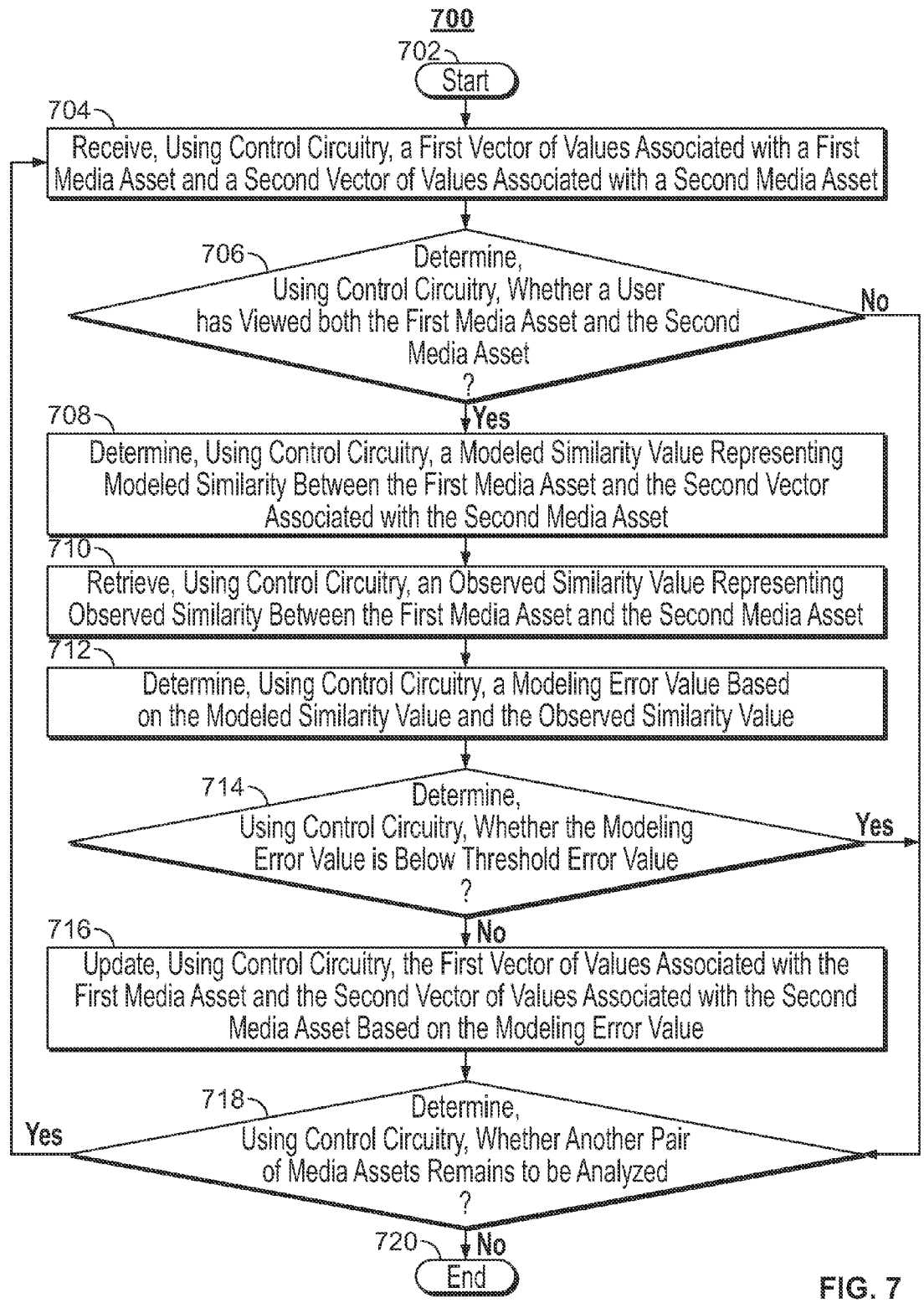
FIG. 7 is a diagram of a process for maintaining a model representing similarity between media assets in accordance with some embodiments of the disclosure.

FIG. 7 is a diagram of process 700 for maintaining a model representing similarity between media assets in accordance with some embodiments of the disclosure. At step 702, a pair of media assets consumed by a user is identified. For example, the media guidance application running on control circuitry 304 may retrieve from storage 308 a viewing history associated with the user. The viewing history may indicate that the first user has viewed media assets associated with asset vectors 500 and 600.

At step 704, control circuitry 304 receives a first vector of values associated with a first media asset and a second vector of values associated with a second media asset. The asset vector for a media asset includes a set of associated weights or relevance of the metadata information for the media asset. For example, control circuitry 304 my receive assets vectors 500 and 600 as described above.

At step 706, control circuitry 304 determines whether a user has viewed both the first media asset and the second media asset. If the media assets related to media asset vectors 500 and 600 have both not been viewed by any user, then confidence metric $c_{ij}$ is zero and the contribution in the error term is zero. Therefore, no adjustments to the asset vectors need to be propagated backwards from this pair of media assets. If control circuitry 304 determines that the user has viewed both assets, it proceeds to step 708. Otherwise control circuitry 304 proceeds to step 718 described further below.

At step 708, control circuitry 304 determines a modeled similarity value representing modeled similarity between the first media asset and the second media asset. The modeled similarity value is determined based on the first vector of values and the second vector of values. Control circuitry 304 may compute modeled similarity, $m_{ij}$, for assets i and j by, e.g., taking dot product of $a_j$ and $a_j$ where $p_i$ and $p_j$ are popularity of assets i and j, $p_0$ is popularity of most popular asset, and a is popularity bias factor. These terms are used to factor in popularity bias into the modeled similarity. Modeled similarity $m_{ij}$ may be defined by the dot product of asset vectors $\bar{a}_i$ and $\bar{a}_j$ as described with respect FIGS. 5-6 above.

At step 710, control circuitry 304 retrieves an observed similarity value representing observed similarity between the first media asset and the second media asset. The observed similarity is based on metadata and usage data for the first and second media assets. Control circuitry 304 may compute observed similarity, $s_{ij}$, for media assets i and j and confidence metric $c_{ij}$ (based on metadata and usage data) using collaborative filtering. In some embodiments, control circuitry 304 computes the observed similarity using Probsim, LogLikelihood, Jaccard, Cooccurrences, Cosine, or any other suitable process.

At step 712, control circuitry 304 determines a modeling error value based on the modeled similarity value and the observed similarity value. The media guidance application constructs an error function that compares the modeled metadata similarity to the observed usage-based similarity. This error is minimized using a function (e.g., a stochastic gradient descent function or another suitable gradient descent function) that changes the weights of the individual metadata components such that the net error between the metadata-based similarities and usage-based similarities is minimized.

At step 714, control circuitry 304 determines whether the modeling error value is below a threshold error value. If the error is below a threshold value, then no further adaption is required as the model is sufficiently trained. If the error is more than the threshold value, the system adapts model for assets i and j by, e.g., backpropagating error through both models. If control circuitry 304 determines that the modeling error value is below the threshold error value, it proceeds to step 718 described further below. Otherwise control circuitry 304 proceeds to step 716.

At step 716, control circuitry 304 updates the first vector of values associated with the first media asset and the second vector of values associated with the second media asset based on the modeling error value. Control circuitry 304 may update weights in media asset vectors 500 and 600 and update other relevant terms in the related computation such as popularity bias factor $\alpha$. After iterating over all the usage data, the individual metadata weights are updated in the media asset vector as the best predictors for the corresponding metadata relevance for the media asset.

At step 718, control circuitry 304 determines whether another pair of media assets remains to be analyzed. If control circuitry 304 determines that another pair of media assets remains to be analyzed, it proceeds to step 704. Otherwise control circuitry 304 proceeds to step 720 and ends the process.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing a recommendation based on a model representing similarity between a plurality of media assets, the method comprising:
   receiving, using control circuitry, a first vector of values associated with a first media asset and a second vector of values associated with a second media asset;
   determining, using the control circuitry, whether a user has viewed both the first media asset and the second media asset;
   in response to determining that the user has viewed both the first media asset and the second media asset:
   determining, using the control circuitry, a modeled similarity value representing modeled similarity between the first media asset and the second media asset, wherein the modeled similarity value is determined based on the first vector of values and the second vector of values;
   retrieving, using the control circuitry, usage data for the first and second media assets, the usage data comprising at least one of: a rating from the user, an amount of time viewed by the user, a number of episodes watched by the user, and a number of related social media interactions by the user;
   calculating, using the control circuitry, an observed similarity value representing observed similarity between the first media asset and the second media asset, wherein the observed similarity is based on the retrieved usage data for the first and second media assets;
   determining, using the control circuitry, a modeling error value that minimizes an error metric computed based on a comparison of the modeled similarity value and the observed similarity value;
   retrieving, using the control circuitry, a threshold error value associated with the model;
   determining, using the control circuitry, whether the modeling error value is below the threshold error value;
   in response to determining that the modeling error value is not below the threshold error value, updating, using the control circuitry, the first vector of values associated with the first media asset and the second vector of values associated with the second media asset based on the modeling error value; and
   providing a media asset recommendation based on at least one of the first vector of values and the second vector of values.

2. The method of claim 1, wherein the first vector of values associated with the first media asset includes one or more metadata-based values related to metadata for the first media asset and one or more free floating values unrelated to metadata for the first media asset.

3. The method of claim 2, wherein updating the first vector of values associated with the first media asset includes updating at least one of the one or more free floating values and the one or more metadata-based values.

4. The method of claim 1, wherein determining the modeling error value includes determining the modeling error value based on a confidence term, wherein a higher confidence term indicates a higher trust in the usage data.

5. The method of claim 1, further comprising:
   retrieving metadata for the first and second media assets, wherein the metadata for the first media asset includes at least one of genre, category, content source, title, series identifier, characteristic, actor, director, cast information, crew, plot, location, description, descriptor, keyword, artist, mood, tone, lyrics, comments, rating, length or duration, transmission time, availability time, and sponsor, and wherein the observed similarity is based on the retrieved metadata for the first and second media assets.

6. The method of claim 1, wherein determining the modeled similarity value comprises:
   determining, using the control circuitry, a distance between the first vector of values and the second vector of values based on a dot product between the first vector of values and the second vector of values; and
   determining, using the control circuitry, the modeled similarity value based on the determined distance.

7. The method of claim 6, wherein updating the first vector of values and second vector of values based on the modeling error value comprises:
   adjusting, using the control circuitry, the values stored in the first vector and the second vector such that the distance between the first vector and the second vector is reduced.

8. The method of claim 1, wherein the observed similarity is determined using Pearson correlation coefficient between the first media asset and the second media asset.

9. The method of claim 1, further comprising:
   in response to determining that no user has viewed both the first media asset and the second media asset, storing, using the control circuitry, a zero value for the modeling error value.

10. A system for providing a recommendation based on a model representing similarity between a plurality of media assets, the system comprising:
    control circuitry configured to:
    receive a first vector of values associated with a first media asset and a second vector of values associated with a second media asset;
    determine whether a user has viewed both the first media asset and the second media asset;
    in response to determining that the user has viewed both the first media asset and the second media asset:
    determine a modeled similarity value representing modeled similarity between the first media asset and the second media asset, wherein the modeled similarity value is determined based on the first vector of values and the second vector of values;
    retrieve usage data for the first and second media assets, the usage data comprising at least one of: a rating from the user, an amount of time viewed by the user, a number of episodes watched by the user, and a number of related social media interactions by the user;
    calculate an observed similarity value representing observed similarity between the first media asset and the second media asset, wherein the observed similarity is based on the retrieved usage data for the first and second media assets;
    determine a modeling error value that minimizes an error metric computed based on a comparison of the modeled similarity value and the observed similarity value;
    retrieve a threshold error value associated with the model;
    determine whether the modeling error value is below the threshold error value;

in response to determining that the modeling error value is not below the threshold error value, update the first vector of values associated with the first media asset and the second vector of values associated with the second media asset based on the modeling error value; and provide a media asset recommendation based on at least one of the first vector of values and the second vector of values.

11. The system of claim 10, wherein the first vector of values associated with the first media asset includes one or more metadata-based values related to metadata for the first media asset and one or more free floating values unrelated to metadata for the first media asset.

12. The system of claim 11, wherein control circuitry configured to update the first vector of values associated with the first media asset includes control circuitry configured to update at least one of the one or more free floating values and the one or more metadata-based values.

13. The system of claim 10, wherein control circuitry configured to determine the modeling error value includes control circuitry configured to determine the modeling error value based on a confidence term, wherein a higher confidence term indicates a higher trust in the usage data.

14. The system of claim 10, wherein the control circuitry is configured to:

retrieving metadata for the first and second media assets, wherein the metadata for the first media asset includes at least one of genre, category, content source, title, series identifier, characteristic, actor, director, cast information, crew, plot, location, description, descriptor, keyword, artist, mood, tone, lyrics, comments, rating, length or duration, transmission time, availability time, and sponsor, and wherein the observed similarity is based on the retrieved metadata for the first and second media assets.

15. The system of claim 10, wherein control circuitry configured to determine the modeled similarity value comprises control circuitry configured to:

determine a distance between the first vector of values and the second vector of values based on a dot product between the first vector of values and the second vector of values; and determine the modeled similarity value based on the determined distance.

16. The system of claim 15, wherein control circuitry configured to update the first vector of values and second vector of values based on the modeling error value comprises control circuitry configured to:

adjust the values stored in the first vector and the second vector such that the distance between the first vector and the second vector is reduced.

17. The system of claim 10, wherein the observed similarity is determined using Pearson correlation coefficient between the first media asset and the second media asset.

18. The system of claim 10, further comprising control circuitry configured to:

in response to determining that no user has viewed both the first media asset and the second media asset, store a zero value for the modeling error value.

* * * * *